United States Patent
Fukuoka et al.

(10) Patent No.: US 11,192,791 B2
(45) Date of Patent: Dec. 7, 2021

(54) LIGHT HYDROCARBON PARTIAL OXIDATION CATALYST AND CARBON MONOXIDE PRODUCTION METHOD USING SAME

(71) Applicants: NATIONAL UNIVERSITY CORPORATION HOKKAIDO UNIVERSITY, Sapporo (JP); TOSOH CORPORATION, Shunan (JP)

(72) Inventors: Atsushi Fukuoka, Sapporo (JP); Hirokazu Kobayashi, Sapporo (JP); Sae Someya, Yokkaichi (JP)

(73) Assignees: NATIONAL UNIVERSITY CORPORATION HOKKAIDO UNIVERSITY, Sapporo (JP); TOSOH CORPORATION, Shunan (JP)

( * ) Notice: Subject to any disclaimer, the term of this patent is extended or adjusted under 35 U.S.C. 154(b) by 0 days.

(21) Appl. No.: 17/046,635

(22) PCT Filed: Mar. 25, 2019

(86) PCT No.: PCT/JP2019/012615
§ 371 (c)(1),
(2) Date: Oct. 9, 2020

(87) PCT Pub. No.: WO2019/198480
PCT Pub. Date: Oct. 17, 2019

(65) Prior Publication Data
US 2021/0163300 A1  Jun. 3, 2021

(30) Foreign Application Priority Data
Apr. 11, 2018  (JP) .............................. JP2018-076129

(51) Int. Cl.
| | | |
|---|---|---|
| C01B 3/40 | (2006.01) | |
| C01B 32/40 | (2017.01) | |
| B01J 29/24 | (2006.01) | |
| B01J 29/46 | (2006.01) | |
| B01J 29/76 | (2006.01) | |
| B01J 29/22 | (2006.01) | |
| B01J 29/74 | (2006.01) | |

(52) U.S. Cl.
CPC .............. *C01B 32/40* (2017.08); *B01J 29/22* (2013.01); *B01J 29/24* (2013.01); *B01J 29/46* (2013.01); *B01J 29/7415* (2013.01); *B01J 29/7615* (2013.01); *C01B 3/40* (2013.01)

(58) Field of Classification Search
CPC ............ C01B 3/40; C01B 32/40; B01J 29/24; B01J 29/46; B01J 29/7615
See application file for complete search history.

(56) References Cited

U.S. PATENT DOCUMENTS

| | | |
|---|---|---|
| 6,312,660 B1 | 11/2001 | Yagi et al. |
| 6,340,437 B1 | 1/2002 | Yagi et al. |
| 2001/0010808 A1 | 8/2001 | Yagi et al. |
| 2004/0127351 A1 | 7/2004 | Basile et al. |
| 2004/0157939 A1 | 8/2004 | Ramani et al. |

FOREIGN PATENT DOCUMENTS

| | | |
|---|---|---|
| JP | 04-063140 A | 2/1992 |
| JP | 11-130404 A | 5/1999 |
| JP | 2004-167485 A | 6/2004 |
| JP | 2006-517176 A | 7/2006 |
| JP | 2007-237084 A | 9/2007 |
| JP | 2017-113719 A | 6/2017 |

OTHER PUBLICATIONS

Hou et al, :Trace mono-atomically dispersed rhodium on zeolite-supported cobalt catalyst for the efficient methane oxidation, Communications Chemistry vol. 1, Article No. 41 (2018) (Year: 2018).*
Chung et al, "Cobalt-Rhodium Heterobimetallic Nanoparticle-Catalyzed N-Alkylation of Amines with Alcohols to Secondary and Tertiary Amines", J. Org. Chem. 2018, 83, 15, 8533-8542 (Year: 2018).*
Borodina et al., "Hydroalkylation of benzene and ethylbenzene over metal-containing zeolite catalysts", Petroleum Chemistry vol. 49, pp. 66-73(2009) (Year: 2009).*
Ozin et al., "Optical Studies of the Genesis of Ligand-Free Cobalt and Rhodium Clusters: Relevance to Oxide- and Polymer-Bound Cobalt and Rhodium Clusters", Inorganic Chemistry, vol. 18, No. 7, 1979 (Year: 1979).*
C.E.Quincoces et al., "Rh-Co mordenite catalysts for the selective reduction of NO by methane", Studies in Surface Science and Catalysis, 2002, pp. 925-931, vol. 143.
International Search Report of PCT/JP2019/012615, dated Jun. 18, 2019 [PCT/ISA/210].
International Preliminary Report on Patentability, dated Oct. 22, 2020, issued by The International Bureau of WIPO in International Application No. PCT/JP2019/012615.

* cited by examiner

*Primary Examiner* — David M Brunsman
(74) *Attorney, Agent, or Firm* — Sughrue Mion, PLLC

(57) ABSTRACT

The present disclosure relates to a partial oxidation catalyst that causes a light hydrocarbon partial oxidation reaction to proceed readily with high activity and high selectivity and a high-yield carbon monoxide production method using the same. The present disclosure further relates to a light hydrocarbon partial oxidation catalyst containing a zeolite supporting cobalt and rhodium.

9 Claims, 1 Drawing Sheet

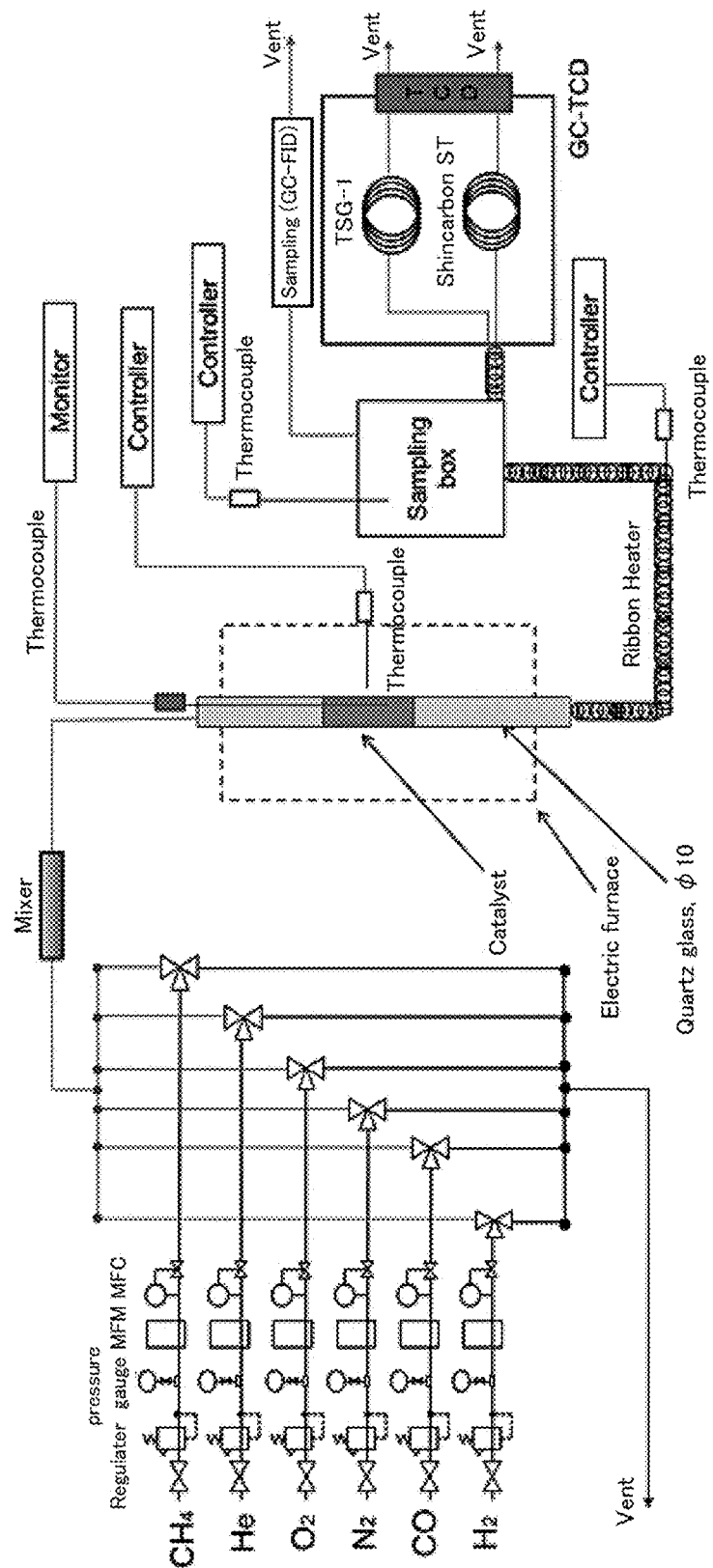

LIGHT HYDROCARBON PARTIAL OXIDATION CATALYST AND CARBON MONOXIDE PRODUCTION METHOD USING SAME

CROSS REFERENCE TO RELATED APPLICATIONS

This application is a National Stage of International Application No. PCT/JP2019/012615, filed Mar. 25, 2019, claiming priority to Japanese Patent Application No. 2018-076129, filed Apr. 11, 2018.

TECHNICAL FIELD

The present invention relates to a partial oxidation catalyst for a light hydrocarbon and, more specifically, relates to a partial oxidation catalyst comprising cobalt and rhodium-supported zeolite, which enables efficient partial oxidation of a light hydrocarbon.

BACKGROUND ART

In recent years, the scale of extracting natural gas and shale gas has been expanding, and thus the importance of industrially utilizing light hydrocarbons such as methane as resources is increasing. Also, energy saving measures are important issues in the chemical manufacturing industry where a large amount of energy is consumed. Accordingly, attention is being drawn to development of a technique for converting a light hydrocarbon into a useful compound (such as synthesis gas for producing an organic compound that can be industrially utilized) in a more energy-efficient manner.

A representative example of a method for industrially utilizing a light hydrocarbon is conversion of methane into synthesis gas (a mixed gas of carbon monoxide and hydrogen) by steam reforming, and the resulting synthesis gas is utilized as raw material for alkane production and methanol production by the Fischer-Tropsch reaction. A general formula of steam reforming is shown as formula (1) below:

$$C_nH_m + nH_2O \rightarrow nCO + (m/2+n)H_2 \quad (1)$$

However, the reaction of this steam reforming is an endothermic reaction and thus requires high temperature conditions of about 800° C. to 1000° C. Accordingly, there is the problem of enormous heat energy consumption in combination with the plant scale thereof.

A known method for obtaining synthesis gas from methane is partial oxidation of methane. Partial oxidation of hydrocarbon proceeds as shown in formula (2) below. This partial oxidation reaction is an exothermic reaction and thus more thermally efficient than steam reforming.

$$C_nH_{2m} + (n/2)O_2 \rightarrow nCO + mH_2 \quad (2)$$

To date, there are reports of catalysts that can be used in partial oxidation of methane, such as a rhodium and/or ruthenium-supported catalyst wherein metal oxide such as magnesia is used as a carrier (see, for example, Patent Literature 1), a catalyst wherein nickel and/or rhodium is supported on a perovskite compound to improve thermal stability (see, for example, Patent Literature 2), and a catalyst wherein silicon carbide with high thermal conductivity is used as a carrier (see, for example, Patent Literature 3).

Also reported is a catalyst wherein $Al_2O_3$ coated with $CeO_2$ is used as a carrier, and nickel as an active metal is supported (see, for example, Patent Literature 4).

However, all the catalysts proposed in Patent Literatures 1 to 3 require a temperature close to 1000° C. or a temperature of 1000° C. or higher for the partial oxidation reaction, and thus require a high temperature comparable to steam reforming. With the catalyst proposed in Patent Literature 4, the partial oxidation reaction proceeds at a low temperature of 600 to 700° C., but selectivity for carbon monoxide is poor, and there is a problem with respect to production efficiency.

A catalyst wherein a transition metal is supported on a zeolite carrier is reported as a catalyst with which the partial oxidation reaction readily proceeds even in a low temperature region, and a high carbon monoxide selectivity can be obtained (see, for example, Patent Literature 5).

CITATION LIST

Patent Literature

Patent Literature 1: JP11-130404 A
Patent Literature 2: JP2004-167485 A
Patent Literature 3: JP2006-517176 A
Patent Literature 4: JP2007-237084 A
Patent Literature 5: JP2017-113719 A

SUMMARY OF INVENTION

Technical Problem

With the catalyst disclosed in Patent Literature 5, the partial oxidation reaction of a light hydrocarbon readily proceeds even in a low temperature region, and a high carbon monoxide selectivity can be obtained. However, there is a demand for a catalyst that enables partial oxidation of a light hydrocarbon to be obtained higher activity and higher selectivity.

Accordingly, an object of the present invention is to provide a novel technology relating to a partial oxidation catalyst that enables partial oxidation reaction of a light hydrocarbon to proceed high activity and high selectivity.

Solution to Problem

As a result of having conducted diligent research to solve the above problem, the inventors found that the partial oxidation of a light hydrocarbon proceeds high activity and high selectivity with a partial oxidation catalyst containing cobalt and rhodium-supported zeolite, and accomplished the present invention.

That is to say, the gist of the present invention is as follows:

[1] A partial oxidation catalyst for a light hydrocarbon, comprising cobalt and rhodium-supported zeolite.

[2] The partial oxidation catalyst according to [1], wherein an amount of the cobalt which is supported is 0.01% by weight or more and 6.0% by weight or less with respect to 100% by weight of the zeolite; an amount of the rhodium which is supported is 0.001% by weight or more and 0.01% by weight or less with respect to 100% by weight of the zeolite; and a ratio of the amount of the cobalt to the amount of the rhodium is 1 or more and 6000 or less.

[3] The partial oxidation catalyst according to [1] or [2], wherein the zeolite is one or a mixture of two or more selected from the group consisting of mordenite zeolite, MFI zeolite, and beta zeolite.

[4] The partial oxidation catalyst according to any one of [1] to [3], wherein the light hydrocarbon is methane or a mixture mainly comprising methane.

[5] A method for producing carbon monoxide, comprising bringing a light hydrocarbon and oxygen into contact with each other in the presence of the partial oxidation catalyst according to any one of [1] to [4] to generate carbon monoxide and hydrogen by partial oxidation.

[6] The method for producing carbon monoxide according to [5], wherein the light hydrocarbon and the oxygen are brought into contact with each other in a temperature range of 300° C. or more and 1000° C. or less.

Advantageous Effects of the Invention

The present invention can provide a novel technology relating to a partial oxidation catalyst that enables the partial oxidation reaction of a light hydrocarbon to proceed high activity and high selectivity.

Moreover, according to one embodiment of the present invention, the amount of expensive precious metals used, such as rhodium, can be reduced, and thus an inexpensive partial oxidation catalyst can be provided.

BRIEF DESCRIPTION OF THE DRAWING

FIG. 1 is a schematic diagram of a reactor for partial oxidation used in Examples.

DESCRIPTION OF EMBODIMENTS

Hereinafter the present invention will now be described in detail.

The partial oxidation catalyst of the present invention comprises cobalt and rhodium-supported zeolite (hereinafter also referred to as "supported zeolite"), and is suitable for producing carbon monoxide and hydrogen from a light hydrocarbon and oxygen by partial oxidation. This partial oxidation catalyst enables the partial oxidation reaction of a light hydrocarbon (production of carbon monoxide and hydrogen from a light hydrocarbon) to proceed high activity and high selectivity than conventional catalysts do. Moreover, even when the amount of expensive precious metals used (such as rhodium) is reduced, the partial oxidation reaction of a light hydrocarbon can proceed high activity and high selectivity, and thus an inexpensive partial oxidation catalyst can be provided as well.

The partial oxidation catalyst of the present invention comprises cobalt and rhodium-supported zeolite, and can be prepared by causing cobalt and rhodium to be supported on zeolite. Comprising cobalt and rhodium-supported zeolite, the catalyst has excellent properties with respect to partial oxidation of a light hydrocarbon (high activity and high selectivity as well as inexpensive catalyst cost).

Zeolite that constitutes the framework may be any substance that belongs to the category referred to as zeolite, and is not particularly limited. For example, metallosilicates such as aluminosilicate, and metallophosphates such as aluminophosphate and silicoaluminophosphate may be used as zeolite. On the other hand, zeolite according to the present invention is preferably one or a mixture of two or more selected from the group consisting of mordenite zeolite, MFI zeolite, and beta zeolite because zeolite according to the present invention becomes a catalyst that enables partial oxidation of a light hydrocarbon to proceed higher activity and higher selectivity. Such zeolite may be commercially available zeolite.

Cobalt and rhodium are supported on zeolite, and there is no limitation as to where they are supported. For example, cobalt and rhodium may be supported by being contained within the framework structure of zeolite (within the framework structure composed of oxygen, silicon, and aluminum when zeolite is aluminosilicate) or may be supported by being fixed to the surface of zeolite. Cobalt and rhodium supported on zeolite are not necessarily supported as cobalt (Co) and rhodium (Rh), and may be supported as ions and compounds.

As a method for producing the supported zeolite that constitutes the partial oxidation catalyst of the present invention, any method can be used as long as the supported zeolite can be produced, and the method is not particularly limited. Examples include a method comprising simultaneously or sequentially impregnating zeolite with a cobalt-containing solution and a rhodium-containing solution and then causing cobalt and rhodium to be supported on the zeolite surface by drying/firing to generate the supported zeolite, and a method comprising bringing zeolite into contact with a cobalt-containing solution and a rhodium-containing solution to cause ion exchange between the zeolite-constituting metals (metals within the framework structure) and cobalt and rhodium, followed by drying/firing to generate the supported zeolite. The cobalt-containing solution may be, for example, a solution in which a cobalt salt is dissolved and/or dispersed in a solvent. The cobalt salt may be cobalt nitrate, and the solvent may be water. The rhodium-containing solution may be, for example, a solution in which a rhodium salt is dissolved and/or dispersed in a solvent. The rhodium salt may be rhodium chloride, and the solvent may be water.

Concerning the amount of cobalt and rhodium which are supported on the resulting supported zeolite (100% by weight), cobalt is preferably 0.01% by weight or more, more preferably 0.01% by weight or more and 10.0% by weight or less, and even more preferably 0.01% by weight or more and 6.0% by weight or less, and rhodium is preferably 0.001% by weight or more, more preferably 0.001% by weight or more and 0.015% by weight or less, and even more preferably 0.001% by weight or more and 0.01% by weight or less, because the higher activity and higher selectivity partial oxidation catalyst can be provided at low cost. The ratio of the amount of cobalt to the amount of rhodium (amount of cobalt supported/amount of rhodium supported) is preferably 1 or more and 6000 or less (weight ratio), and more preferably 1 or more and 3000 or less (weight ratio). Herein, the amounts of cobalt and rhodium which are supported refer to the amounts of cobalt (Co) and rhodium (Rh) supported on zeolite, and when cobalt and rhodium in the form of compounds are supported on zeolite, the amounts refer to the amounts of Co and Rh in the compounds.

The partial oxidation catalyst of the present invention contains the supported zeolite, and, naturally, may solely contain the supported zeolite and may also contain a binder, a diluent, and the like.

The partial oxidation catalyst of the present invention enables highly selective and highly efficient production of carbon monoxide and hydrogen as a partial oxidation catalyst for a light hydrocarbon. Examples of the light hydrocarbon include methane, ethane, ethylene, propane, propylene, butene, butane, and a substance mainly comprising such a compound (50% by volume or more) and, in particular, methane or a substance mainly comprising methane can be partially oxidized in a particularly efficient manner. Herein, the light hydrocarbon refers to a hydrocarbon having 1 to 4 carbon atoms. Also, partial oxidation refers to not a reaction by which a light hydrocarbon is completely oxidized but refers to a reaction by which a light hydrocarbon is partially oxidized. More specifically, it refers to a reaction by which carbon monoxide and hydrogen are produced from a light hydrocarbon. For example, the partial oxidation (reaction) of methane can be represented by formula (3) below:

$$CH_4 + \tfrac{1}{2}O_2 \rightarrow CO + 2H_2 \qquad (3)$$

When producing carbon monoxide with the partial oxidation catalyst of the present invention, a method may be used that comprises bringing a light hydrocarbon and oxygen into contact with each other in the presence of the partial oxidation catalyst to partially oxidize the light hydrocarbon and thus produce carbon monoxide and hydrogen. The temperature at the time of bringing a raw material gas containing a light hydrocarbon and oxygen into contact with the partial oxidation catalyst is preferably in a temperature range of 300° C. to 1000° C. and in particular 400° C. to 800° C.

The form of reaction when producing carbon monoxide may be a fluidized bed or a fixed bed, and, in particular, the fixed bed flow type is preferable because it enables efficient production.

A light hydrocarbon and oxygen that are a raw material gas may be used directly or after being diluted with an inert gas. The inert gas is not particularly limited, and examples include nitrogen, helium, and argon. Such inert gases can be used not only solely but also as a mixture of two or more.

The novel partial oxidation catalyst of the present invention enables a mixed gas of carbon monoxide and hydrogen to be obtained higher activity and higher selectivity than conventional steam reforming and partial oxidation reactions do. Moreover, even when the amount of expensive precious metals used (such as rhodium) is reduced, the partial oxidation reaction of a light hydrocarbon proceeds high activity and high selectivity, it is thus expected that the costs of catalyst production are reduced, and the catalyst is industrially extremely advantageous.

EXAMPLES

Below, the present invention will now be described in more detail by way of Examples, but the present invention is not limited to the Examples.

Example 1

First, 500 mg of mordenite zeolite HMOR (Reference catalyst of Catalysis Society of Japan JRC—Z-HM90 (Si/Al ratio=45)) that had been fired at 550° C. for 8 hours was suspended in 25 ml of an aqueous solution containing 10.5 mM cobalt nitrate and 1.9 μM rhodium chloride, and stirred at room temperature for 24 hours. The mixture was evaporated to dryness at 40° C. under vacuum and dried at 110° C. overnight. Thereafter, the mixture was fired at 550° C. for 6 hours, and thus a partial oxidation catalyst (Co—Rh/MOR) was obtained. The amounts of the metals which were supported and the weight ratio of cobalt/rhodium are shown in Table 1. As shown in Table 1, the amounts of the metals which were supported were regulated such that cobalt was 3.0 wt % and rhodium was 0.001 wt % with respect to supported zeolite (100 wt %), and that the weight ratio of cobalt/rhodium was 3000.

By using a fixed bed gas flow reactor having a quartz glass reaction tube (outer diameter 10 mm, length 420 mm) was used, the middle portion of the glass reaction tube was filled with 20 mg of the resulting partial oxidation catalyst. And the electric furnace was heated to 150° C. in a helium stream (1.8 ml/min). Thereafter, methane at 2 ml/min and oxygen at 0.2 ml/min were introduced, and methane was partially oxidized at a reaction temperature of 600° C. The downstream of the reactor was maintained at 120° C. by a ribbon heater to prevent aggregation of the product, and an online GC analysis was performed to verify the product. At that time, as for the gas chromatograph (GC), GC-8A (trade name) (manufactured by Shimadzu Corporation) was used, as for the GC columns, Shincarbon ST 50/80 (trade name) (manufactured by Shinwa Chemical Industries Ltd., φ3 mm×length 2 m) and TSG-1 15% Shincarbon A 60/80 (manufactured by Shinwa Chemical Industries Ltd., φ3.2 mm×length 3 m) were used, and the column temperature was maintained at 120° C. As for the detector, TCD was used. Separately, the product was also analyzed by GC-FID and GCMS. As for the GC-FID gas chromatograph, GC-14B (trade name) (manufactured by Shimadzu Corporation) was used, and as for the column, ULBON HR20M (trade name) (manufactured by Shinwa Chemical Industries Ltd., φ0.25 mm×length 25 m, film thickness: 0.25 μm) was used. The evaluation apparatus is schematically shown in FIG. 1 (note that nitrogen, carbon monoxide, and hydrogen were not fed). The reaction results are shown in Table 2. The yield of carbon monoxide was 11%, and thus a high yield of carbon monoxide was confirmed.

The conversion ratio, yield, and selectivity shown in Table 2 were calculated according to the following formulae:

Methane conversion ratio (%)=(Moles of methane reacted in unit time/Moles of methane fed in unit time)×100

CO yield (%)=(Moles of CO produced in unit time/Moles of methane fed in unit time)×100

$CO_2$ yield (%)=(Moles of $CO_2$ produced in unit time/Moles of methane fed in unit time)×100

CO selectivity (%)=(CO yield/Methane conversion ratio)×100

Example 2

A partial oxidation catalyst (Co—Rh/MOR) was obtained in the same manner as in Example 1 except that 25 ml of an aqueous solution containing 10.5 mM cobalt nitrate and 3.8 μM rhodium chloride was used as an aqueous metal salt solution. The amounts of the metals which were supported and the weight ratio of cobalt/rhodium are shown in Table 1. As shown in Table 1, the amounts of the metals which were supported were regulated such that cobalt was 3.0 wt % and rhodium was 0.002 wt % with respect to supported zeolite (100 wt %), and that the weight ratio of cobalt/rhodium was 1500.

This partial oxidation catalyst was used to partially oxidize methane in the same manner as in Example 1. The reaction results are shown in Table 2. The yield of carbon monoxide was 11%, and thus a high yield of carbon monoxide was confirmed.

Example 3

A partial oxidation catalyst (Co—Rh/MOR) was obtained in the same manner as in Example 1 except that 25 ml of an aqueous solution containing 10.5 mM cobalt nitrate and 5.8 μM rhodium chloride was used as an aqueous metal salt solution. The amounts of the metals which were supported and the weight ratio of cobalt/rhodium are shown in Table 1. As shown in Table 1, the amounts of the metals which were supported were regulated such that cobalt was 3.0 wt % and rhodium was 0.003 wt % with respect to supported zeolite (100 wt %), and that the weight ratio of cobalt/rhodium was 1000.

This partial oxidation catalyst was used to partially oxidize methane in the same manner as in Example 1. The reaction results are shown in Table 2. The yield of carbon monoxide was 10%, and thus a high yield of carbon monoxide was confirmed.

Example 4

A partial oxidation catalyst (Co—Rh/MOR) was obtained in the same manner as in Example 1 except that 25 ml of an aqueous solution containing 10.5 mM cobalt nitrate and 7.7 µM rhodium chloride was used as an aqueous metal salt solution. The amounts of the metals which were supported and the weight ratio of cobalt/rhodium are shown in Table 1. As shown in Table 1, the amounts of the metals which were supported were regulated such that cobalt was 3.0 wt % and rhodium was 0.004 wt % with respect to supported zeolite (100 wt %), and that the weight ratio of cobalt/rhodium was 750.

This partial oxidation catalyst was used to partially oxidize methane in the same manner as in Example 1. The reaction results are shown in Table 2. The yield of carbon monoxide was 12%, and thus a high yield of carbon monoxide was confirmed.

Example 5

A partial oxidation catalyst (Co—Rh/MOR) was obtained in the same manner as in Example 1 except that 25 ml of an aqueous solution containing 10.5 mM cobalt nitrate and 9.6 µM rhodium chloride was used as an aqueous metal salt solution. The amounts of the metals which were supported and the weight ratio of cobalt/rhodium are shown in Table 1. As shown in Table 1, the amounts of the metals which were supported were regulated such that cobalt was 3.0 wt % and rhodium was 0.005 wt % with respect to supported zeolite (100 wt %), and that the weight ratio of cobalt/rhodium was 600.

This partial oxidation catalyst was used to partially oxidize methane in the same manner as in Example 1. The reaction results are shown in Table 2. The yield of carbon monoxide was 15%, and thus a high yield of carbon monoxide was confirmed.

Example 6

A partial oxidation catalyst (Co—Rh/MOR) was obtained in the same manner as in Example 1 except that 25 ml of an aqueous solution containing 10.5 mM cobalt nitrate and 11.5 µM rhodium chloride was used as an aqueous metal salt solution. The amounts of the metals which were supported and the weight ratio of cobalt/rhodium are shown in Table 1. As shown in Table 1, the amounts of the metals which were supported were regulated such that cobalt was 3.0 wt % and rhodium was 0.006 wt % with respect to supported zeolite (100 wt %), and that the weight ratio of cobalt/rhodium was 500.

This partial oxidation catalyst was used to partially oxidize methane in the same manner as in Example 1. The reaction results are shown in Table 2. The yield of carbon monoxide was 15%, and thus a high yield of carbon monoxide was confirmed.

Example 7

A partial oxidation catalyst (Co—Rh/MOR) was obtained in the same manner as in Example 1 except that 25 ml of an aqueous solution containing 3.5 mM cobalt nitrate and 9.6 µM rhodium chloride was used as an aqueous metal salt solution. The amounts of the metals which were supported and the weight ratio of cobalt/rhodium are shown in Table 1. As shown in Table 1, the amounts of the metals which were supported were regulated such that cobalt was 1.0 wt % and rhodium was 0.005 wt % with respect to supported zeolite (100 wt %), and that the weight ratio of cobalt/rhodium was 200.

This partial oxidation catalyst was used to partially oxidize methane in the same manner as in Example 1. The reaction results are shown in Table 2. The yield of carbon monoxide was 10%, and thus a high yield of carbon monoxide was confirmed.

Example 8

A partial oxidation catalyst (Co—Rh/MOR) was obtained in the same manner as in Example 1 except that 25 ml of an aqueous solution containing 21 mM cobalt nitrate and 9.6 µM rhodium chloride was used as an aqueous metal salt solution. The amounts of the metals which were supported and the weight ratio of cobalt/rhodium are shown in Table 1. As shown in Table 1, the amounts of the metals which were supported were regulated such that cobalt was 6.0 wt % and rhodium was 0.005 wt % with respect to supported zeolite (100 wt %), and that the weight ratio of cobalt/rhodium was 1200.

This partial oxidation catalyst was used to partially oxidize methane in the same manner as in Example 1. The reaction results are shown in Table 2. The yield of carbon monoxide was 11%, and thus a high yield of carbon monoxide was confirmed.

Example 9

The partial oxidation catalyst obtained in Example 5 was used to partially oxidize methane in the same manner as in Example 1 except that methane (10 mL/min), oxygen (0.8 mL/min), and helium (9.2 mL/min) were allowed to flow. The reaction results are shown in Table 2. The yield of carbon monoxide was 14%, and thus a high yield of carbon monoxide was confirmed.

Comparative Example 1

A partial oxidation catalyst (Co/MOR) was obtained in the same manner as in Example 5 except that only an aqueous cobalt nitrate solution was used as an aqueous metal salt solution. As shown in Table 1, the amount of the metal which was supported was regulated such that cobalt was 3.0 wt % with respect to cobalt-supported zeolite (100 wt %).

Methane was partially oxidized in the same manner as in Example 9. The reaction results are shown in Table 2. The yield of carbon monoxide was 0.1%, and thus the yield of carbon monoxide was small.

Comparative Example 2

A partial oxidation catalyst (Rh/MOR) was obtained in the same manner as in Example 5 except that only an aqueous rhodium chloride solution was used as an aqueous metal salt solution. As shown in Table 1, the amount of the metal which was supported was regulated such that rhodium was 0.005 wt % with respect to rhodium-supported zeolite (100 wt %).

Methane was partially oxidized in the same manner as in Example 9. The reaction results are shown in Table 2. The yield of carbon monoxide was 2.2%, and thus the yield of carbon monoxide was small.

Example 10

A partial oxidation catalyst (Co—Rh/ZSM-5) was obtained in the same manner as in Example 5 except that ZSM-5 zeolite (MFI zeolite) (Reference catalyst of Catalysis Society of Japan JRC-Z5-90H, Si/Al ratio=45) was used as a carrier. The amounts of the metals which were supported and the weight ratio of cobalt/rhodium are shown in Table 1. As shown in Table 1, the amounts of the metals which were supported were regulated such that cobalt was 3.0 wt % and rhodium was 0.005 wt % with respect to supported zeolite (100 wt %), and that the weight ratio of cobalt/rhodium was 600.

Methane was partially oxidized in the same manner as in Example 9. The reaction results are shown in Table 2. The yield of carbon monoxide was 14%, and thus a high yield of carbon monoxide was confirmed.

Example 11

A partial oxidation catalyst (Co—Rh/Beta) was obtained in the same manner as in Example 5 except that beta zeolite (Tosoh HSZ-960-HOA, Si/Al ratio=50) was used as a carrier. The amounts of the metals which were supported and the weight ratio of cobalt/rhodium are shown in Table 1. As shown in Table 1, the amounts of the metals which were supported were regulated such that cobalt was 3.0 wt % and rhodium was 0.005 wt % with respect to supported zeolite (100 wt %), and that the weight ratio of cobalt/rhodium was 600.

Methane was partially oxidized in the same manner as in Example 9. The reaction results are shown in Table 2. The yield of carbon monoxide was 14%, and thus a high yield of carbon monoxide was confirmed.

Example 12

Co—Rh/MOR (5 mg) prepared in Example 5 and mordenite zeolite HMOR (5 mg) of Example 1 on which no metal was supported were mixed to obtain a mixture. Concerning Co—Rh/MOR contained in the mixture, the amounts of the metals which were supported and the weight ratio of cobalt/rhodium are shown in Table 1. The resulting mixture was used to partially oxidize methane in the same manner as in Example 1 except that methane (3.3 mL/min), oxygen (1.67 mL/min), and helium (95 mL/min) were allowed to flow, and that the reaction temperature was 650° C. The yield of carbon monoxide was 79%, and the molar ratio of hydrogen/carbon monoxide was 2.0. At 50 hours after the beginning of reaction, 130 million molecules of carbon monoxide were produced per rhodium atom, greatly exceeding the value (2.6 million molecules) obtained under the same condition in which the catalyst of Patent Literature 5 was used.

Comparative Example 3

A partial oxidation catalyst (Co—Rh/SiO$_2$) was obtained in the same manner as in Example 5 except that silica (Reference catalyst of Catalysis Society of Japan JRC-SIO-9A) was used in place of zeolite as a carrier. The amounts of the metals which were supported and the cobalt/rhodium weight ratio are shown in Table 1. As shown in Table 1, the amounts of the metals which were supported were regulated such that cobalt was 3.0 wt % and rhodium was 0.005 wt % with respect to cobalt and rhodium-supported silica (100 wt %), and that the weight ratio of cobalt/rhodium was 600.

Methane was partially oxidized in the same manner as in Example 9. The reaction results are shown in Table 2. The yield of carbon monoxide was 5.3%, and thus the yield of carbon monoxide was small.

Comparative Example 4

A partial oxidation catalyst (Co—Rh/SiO$_2$—Al$_2$O$_3$) was obtained in the same manner as in Example 5 except that silica-alumina (Si/Al ratio=45, prepared by sol-gel method, a mixture of Si oxide and Al oxide) was used in place of zeolite as a carrier. The amounts of the metals which were supported and the cobalt/rhodium weight ratio are shown in Table 1. As shown in Table 1, the amounts of the metals which were supported were regulated such that cobalt was 3.0 wt % and rhodium was 0.005 wt % with respect to cobalt and rhodium-supported silica-alumina (100 wt %), and that the weight ratio of cobalt/rhodium was 600.

Methane was partially oxidized in the same manner as in Example 9. The reaction results are shown in Table 2. The yield of carbon monoxide was 6.3%, and thus the yield of carbon monoxide was small.

Comparative Example 5

Mordenite zeolite HMOR of Example 1 on which no metal was supported was used to partially oxidize methane in the same manner as in Example 9. The reaction results are shown in Table 2. The yield of carbon monoxide was 0.01%, and thus the yield of carbon monoxide was small.

TABLE 1

| | | Composition | | |
| --- | --- | --- | --- | --- |
| No. | Catalyst | Co [wt %] | Rh [wt %] | Co/Rh weight ratio [vol/vol] |
| Example 1 | Co—Rh/MOR | 3 | 0.001 | 3000 |
| Example 2 | Co—Rh/MOR | 3 | 0.002 | 1500 |
| Example 3 | Co—Rh/MOR | 3 | 0.003 | 1000 |
| Example 4 | Co—Rh/MOR | 3 | 0.004 | 750 |
| Example 5 | Co—Rh/MOR | 3 | 0.005 | 600 |
| Example 6 | Co—Rh/MOR | 3 | 0.006 | 500 |
| Example 7 | Co—Rh/MOR | 1 | 0.005 | 200 |
| Example 8 | Co—Rh/MOR | 6 | 0.005 | 1200 |
| Example 9 | Same as Example 5 | | | |
| Example 10 | Co—Rh/ZSM-5 | 3 | 0.005 | 600 |
| Example 11 | Co—Rh/Beta | 3 | 0.005 | 600 |
| Example 12 | Co—Rh/MOR + HMOR | 3 | 0.005 | 600 |
| Comparative Example 1 | Co/MOR | 3 | — | — |
| Comparative Example 2 | Rh/MOR | — | 0.005 | — |
| Comparative Example 3 | Co—Rh/SiO$_2$ | 3 | 0.005 | 600 |
| Comparative Example 4 | Co—Rh/SiO$_2$—Al$_2$O$_3$ | 3 | 0.005 | 600 |
| Comparative Example 5 | HMOR | — | — | — |

TABLE 2

| No. | Catalyst | Reaction condition | | | | Reaction result | | | |
|---|---|---|---|---|---|---|---|---|---|
| | | Methane [mL/min] | Oxygen [mL/min] | Helium [mL/min] | Reaction temperature [° C.] | Methane conversion [%] | CO yield [%] | $CO_2$ yield [%] | CO selectivity [%] |
| Example 1 | Co—Rh/MOR | 2 | 0.2 | 1.8 | 600 | 13 | 11 | 2 | 85 |
| Example 2 | Co—Rh/MOR | 2 | 0.2 | 1.8 | 600 | 14 | 11 | 2.4 | 79 |
| Example 3 | Co—Rh/MOR | 2 | 0.2 | 1.8 | 600 | 13 | 10 | 2.5 | 77 |
| Example 4 | Co—Rh/MOR | 2 | 0.2 | 1.8 | 600 | 14 | 12 | 1.9 | 86 |
| Example 5 | Co—Rh/MOR | 2 | 0.2 | 1.8 | 600 | 16 | 15 | 0.4 | 94 |
| Example 6 | Co—Rh/MOR | 2 | 0.2 | 1.8 | 600 | 16 | 15 | 0.8 | 94 |
| Example 7 | Co—Rh/MOR | 2 | 0.2 | 1.8 | 600 | 13 | 10 | 2.5 | 77 |
| Example 8 | Co—Rh/MOR | 2 | 0.2 | 1.8 | 600 | 14 | 11 | 2.4 | 79 |
| Example 9 | Co—Rh/MOR | 10 | 0.8 | 9.2 | 600 | 15 | 14 | 1.5 | 90 |
| Example 10 | Co—Rh/ZSM-5 | 10 | 0.8 | 9.2 | 600 | 15 | 14 | 1.4 | 90 |
| Example 11 | Co—Rh/Beta | 10 | 0.8 | 9.2 | 600 | 15 | 14 | 1.5 | 89 |
| Example 12 | Co—Rh/MOR + HMOR | 3.3 | 1.67 | 95 | 650 | 86 | 79 | 7.4 | 91 |
| Comparative Example 1 | Co/MOR | 10 | 0.8 | 9.2 | 600 | 4.6 | 0.1 | 4.5 | 2.5 |
| Comparative Example 2 | Rh/MOR | 10 | 0.8 | 9.2 | 600 | 5.7 | 2.2 | 3.4 | 39 |
| Comparative Example 3 | Co—Rh/$SiO_2$ | 10 | 0.8 | 9.2 | 600 | 8.4 | 5.3 | 3.1 | 63 |
| Comparative Example 4 | Co—Rh/$SiO_2$—$Al_2O_3$ | 10 | 0.8 | 9.2 | 600 | 10 | 6.3 | 3.9 | 62 |
| Comparative Example 5 | HMOR | 10 | 0.8 | 9.2 | 600 | 0.6 | 0.01 | 0.6 | 1.7 |

INDUSTRIAL APPLICABILITY

The novel partial oxidation catalyst of the present invention enables a mixed gas of carbon monoxide and hydrogen to be obtained higher activity and higher selectivity than conventional steam reforming and partial oxidation reactions do. Moreover, by reducing the amount of precious metals used in a catalyst, an inexpensive catalyst can be produced. Accordingly, major economic effects are expected, and thus the catalyst is industrially extremely advantageous.

The invention claimed is:

1. A catalyst comprising cobalt and rhodium-supported zeolite, wherein in said catalyst, an amount of the rhodium which is supported is 0.001% by weight or more and 0.01% by weight or less with respect to 100% by weight of the zeolite.

2. The catalyst according to claim 1, wherein
an amount of the cobalt which is supported is 0.01% by weight or more and 6.0% by weight or less with respect to 100% by weight of the zeolite; and
a ratio of the amount of the cobalt to the amount of the rhodium is 1 or more and 6000 or less.

3. The catalyst according to claim 1, wherein the zeolite is one or a mixture of two or more selected from the group consisting of mordenite zeolite, MFI zeolite, and beta zeolite.

4. A method for producing carbon monoxide, comprising bringing a light hydrocarbon and oxygen into contact with each other in the presence of a catalyst to generate carbon monoxide and hydrogen by partial oxidation, wherein said catalyst comprises cobalt and rhodium-supported zeolite.

5. The method for producing carbon monoxide according to claim 4, wherein the light hydrocarbon and the oxygen are brought into contact with each other in a temperature range of 300° C. or more and 1000° C. or less.

6. The method according to claim 4, wherein in said catalyst, an amount of the rhodium which is supported is 0.001% by weight or more and 0.01% by weight or less with respect to 100% by weight of the zeolite.

7. The method according to claim 6, wherein in said catalyst,
an amount of the cobalt which is supported is 0.01% by weight or more and 6.0% by weight or less with respect to 100% by weight of the zeolite; and
a ratio of the amount of the cobalt to the amount of the rhodium is 1 or more and 6000 or less.

8. The method according to claim 4, wherein in said catalyst, the zeolite is one or a mixture of two or more selected from the group consisting of mordenite zeolite, MFI zeolite, and beta zeolite.

9. The method according to claim 4, wherein the light hydrocarbon is methane or a mixture mainly comprising methane.

* * * * *